United States Patent
Sakamoto et al.

(10) Patent No.: US 7,490,523 B2
(45) Date of Patent: Feb. 17, 2009

(54) OCCUPANT LOAD DETECTING DEVICE OF SEAT FOR VEHICLE

(75) Inventors: Kazunori Sakamoto, Chiryu (JP); Hideki Kawabata, Chita-gun (JP); Muneto Inayoshi, Nagoya (JP); Satohiko Nakano, Chiryu (JP); Mutsuro Aoyama, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 11/976,715

(22) Filed: Oct. 26, 2007

(65) Prior Publication Data
US 2008/0098822 A1    May 1, 2008

(30) Foreign Application Priority Data
Oct. 31, 2006  (JP)  ............ 2006-296898
Sep. 28, 2007  (JP)  ............ 2007-253397

(51) Int. Cl.
   *G01L 1/26* (2006.01)
(52) U.S. Cl. ............... 73/862.391; 73/862.474
(58) Field of Classification Search ................. 73/862.391–862.393
   See application file for complete search history.

(56) References Cited

U.S. PATENT DOCUMENTS 6,242,701 B1   6/2001  Breed et al.
6,342,701 B1 * 1/2002  Kash ................. 250/458.1
7,155,981 B2 * 1/2007  Matsuura et al. .......... 73/781
7,189,931 B2 * 3/2007  Hida et al. ............... 177/144

FOREIGN PATENT DOCUMENTS

JP    2003-83707 A    3/2003
JP    2004-069535 A   3/2004
WO    WO 2005/080931 A  9/2005
WO    WO 2006-011597 A1 2/2006

\* cited by examiner

*Primary Examiner*—Max Noori
(74) *Attorney, Agent, or Firm*—Buchanan Ingersoll & Rooney PC

(57) ABSTRACT

An occupant load detecting device of a seat for a vehicle includes a strain member arranged between a floor-side fixing member and a seat-side fixing member and having a strain gauge, a connecting member fixed to the strain member and securely connected to one of the floor-side fixing member and the seat-side fixing member, a first supporting member relatively immovably fitted into a fixing hole and fixed to an attachment surface formed at the other one of the floor-side fixing member and the seat-side fixing member to support the strain member, a second supporting member fitted into an attachment hole and fixed to the attachment surface, and a bracket including first and second fixing portions and an amplifier case fixing portion continuous with the first and second fixing portions and extending at a side of the strain member in a lateral direction of the seat.

2 Claims, 5 Drawing Sheets

OCCUPANT LOAD DETECTING DEVICE OF SEAT FOR VEHICLE

CROSS REFERENCE TO RELATED APPLICATIONS

This application is based on and claims priority under 35 U.S.C. § 119 to Japanese Patent Application 2006-296898, filed on Oct. 31, 2006, and Japanese Patent Application 2007-253397, filed on Sep. 28, 2007, the entire content of which is incorporated herein by reference.

FIELD OF THE INVENTION

This invention relates to an occupant load detecting device of a seat for a vehicle, which detects gravity of a vehicle occupant seated on the seat for the vehicle.

BACKGROUND

Recent requirements have led to controlling of operations of safety devices in accordance with a weight of an occupant seated on a seat for a vehicle, for the purpose of enhancing performances of safety devices, such as a seat belt, an air bag, and so on.

WO2006/011597 (hereinafter, referred to as reference 1) discloses therein an occupant weight measurement device. The occupant weight measurement device includes: a left and right pair of fixed lower rails fixed to a vehicle; a pair of movable upper rails provided so as to be movable in backward and forward directions on the respective fixed lower rails; a load sensor mounted on each movable upper rail and having a rod extending vertically upwardly; and a rectangular frame mounted above the pair of movable upper rails and formed with installation holes. The rods of the load sensors are vertically upwardly inserted into the installation holes of the rectangular frame, respectively and, thus the rectangular frame is mounted on the load sensors.

As described above, because the rectangular frame, which is shaped in advance, is mounted on the load sensors with the rods of the load sensors vertically upwardly inserted into the installation holes of the rectangular frame, occurrences of initial strain and initial load are restrained. As a result, it is possible to measure a weight of an occupant more precisely than an occupant weight measurement device, by which components for the rectangular frame are mounted on the load sensors and then assembled to the rectangular frame.

In addition, a strain sensor is disclosed in Japanese Patent No. 2003-83707A (hereinafter, referred to as reference 2). According to the strain sensor of the reference 2, a detecting member is press-fitted into a detecting hole of a sensor substrate (strain member), and an external force (an external force for generating a strain to be detected) is applied to an end portion of the detecting member, which the sensor substrate (strain member) is in contact with. In the mean time, a first fixing member is press-fitted into a first fixing hole of the sensor substrate (strain member) and a second fixing member is press-fitted into a second fixing hole of the sensor substrate. The strain sensor is configured to apply component force, relative to the external force, to end portions of the first and second fixing members respectively, end portions which the sensor substrate (strain member) makes contact with.

According to a detecting device with the above-described structure, positions, where the sensor substrate (strain member) and the end portions of the detecting member, the first fixing member, and of the second fixing member respectively make contact with, are not dislocated. Therefore, a bending stress applied to a strain detecting element (strain gauge) is stabilized and an output precision of the strain sensor is increased.

In the aforementioned occupant weight measurement device according to the reference 1, load, which corresponds to a weight of an occupant, is converted into an electrical signal by a strain gauge at a sensing portion of the load sensor. The electrical signal, however, is influenced by even slight variations in electrical resistance. Therefore, in general, an amplifier having an electronic circuit is arranged in parallel, so that the variations in electrical resistance are amplified to be read. Meanwhile, various electromagnetic waves are induced by various in-vehicle equipments, such as drivers, lighting equipment, and so on, and influence on complex electronic circuits, so that an erroneous measurement and improper operations may occur. In light of the foregoing, in general, the amplifier is housed in an amplifier case made of metal such as aluminum, and the amplifier and the amplifier case are both connected to earth, thereby shielding electromagnetic waves (noise). However, when the aluminum-made amplifier case is housed in the sensing portion, the sensing portion becomes large and requires more space.

Further, according to the strain sensor disclosed in reference 2, the sensor substrate (strain member) is immovably fixed by the first and second fixing members. Therefore, when the external force is applied between the both first and second fixing members, the sensor substrate receives a tensile force in directions of the first and second fixing members and is prevented from being flexibly deformed. In addition, the sensor substrate is configured so that the component force is generated at the end portions where the fixing members make contact with the sensor substrate (strain member), thus preventing the sensor substrate from being flexibly deformed. Accordingly, sensitivity for detecting the load may be reduced.

A need thus exists for an occupant load detecting device which is not susceptible to the drawback mentioned above.

SUMMARY OF THE INVENTION

According to an aspect of the present invention, an occupant load detecting device of a seat for a vehicle includes a strain member, a connecting member, a first supporting member, a second supporting member, and a bracket. The strain member is arranged between a floor-side fixing member which is adapted to be fixedly mounted on a vehicle floor and a seat-side fixing member which is adapted to be fixedly attached to a vehicle seat. Further, the strain member has a strain gauge. The connecting member is fixed to the strain member in a vertical direction of the seat and securely connected to one of the floor-side fixing member and the seat-side fixing member. The first fixing member is relatively immovably fitted into a fixing hole which is formed at one end portion of the strain member. Further, the first fixing member is fixed to an attachment surface which is formed at the other one of the floor-side fixing member and the seat-side fixing member to support the strain member with a predetermined distance from the attachment surface. The second fixing member is fitted into an attachment hole which is formed at the other end portion of the strain member including a predetermined gap with the attachment hole. In addition, the second supporting member is fixed to the attachment surface formed at the other one of the floor-side fixing member and the seat-side fixing member to support the strain member with the predetermined distance from the attachment surface. The bracket includes a first fixing portion which relatively immovably fixes the first supporting member at one end portion of the bracket and a second fixing portion which relatively immovably fixes the second supporting member at the other end portion of the bracket. Further, the bracket is formed with an amplifier case fixing portion which is continuous with the first fixing portion and the second fixing portion and extends at a side of the strain member in a lateral direction of the seat.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
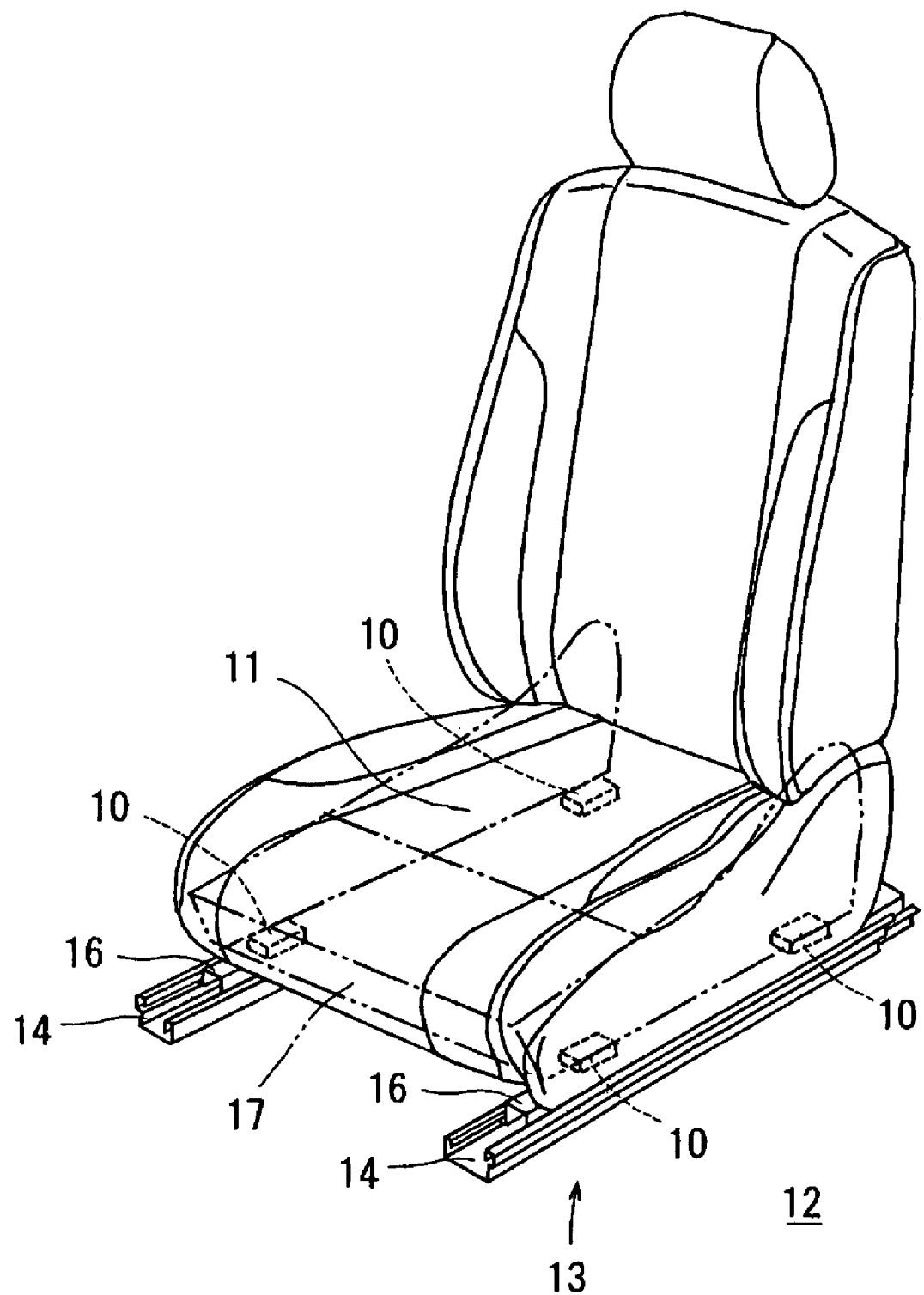
FIG. 1 is a perspective view of a seat applied with an occupant load detecting device of a seat for a vehicle according to the embodiment.

An occupant load detecting device 10 of a seat for a vehicle according to an embodiment of the present invention will be described hereinafter with reference to the attached drawings. The occupant load detecting device 10 is configured to measure a load of an occupant seated on a seat 11 for a vehicle, illustrated in FIG. 1. A seat sliding apparatus 13 illustrated in FIG. 1 is configured to secure the seat 11 to a vehicle floor 12 in a manner that the seat 11 is adjustably positioned in a longitudinal direction of the vehicle. The seat sliding apparatus 13 includes: a pair of lower rails 14 fixedly mounted on the floor 12 and extending in the longitudinal direction; and a pair of upper rails 16 (floor-side fixing member) slidably supported by the lower rails 14.

Figure 2:
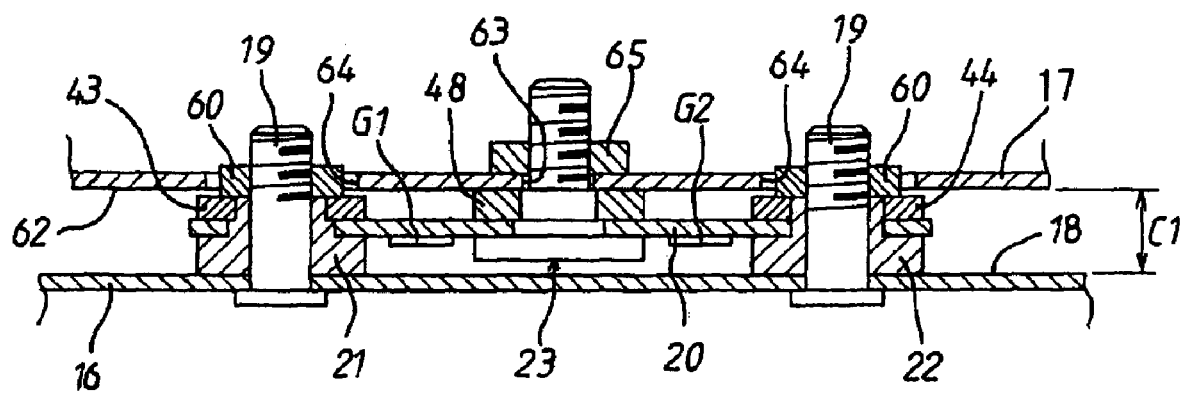
FIG. 2 is an enlarged view illustrating the occupant load detecting device of the seat for the vehicle assembled to a flame of the seat.

As illustrated in FIGS. 1 and 2, a lower portion of the seat 11 is structured with a frame 17 (seat side fixing member) attached to a lower surface of a seat cushion. Among the four corners of the lower surface of the frame 17, two of the corners arranged in the longitudinal direction are fixed to fixing surfaces 18, which are formed at an upper surface of one of the upper rails 16, via the occupant load detecting device 10. Other two of the four corners arranged in the longitudinal direction are fixed to fixing surfaces 18, which are formed at an upper surface of the other one of the upper rails 16, via the occupant load detecting device 10. A pair of fixed shafts 19 is arranged with a predetermined distance therebetween at each end of each upper rail 16, an end where the occupant load detecting device 10 is located. The fixed shafts 19 protrude vertically upwardly at each end of each upper rail 16, so that the corresponding occupant load detecting device 10 is fixedly mounted on the fixing surface 18.

Figure 3:
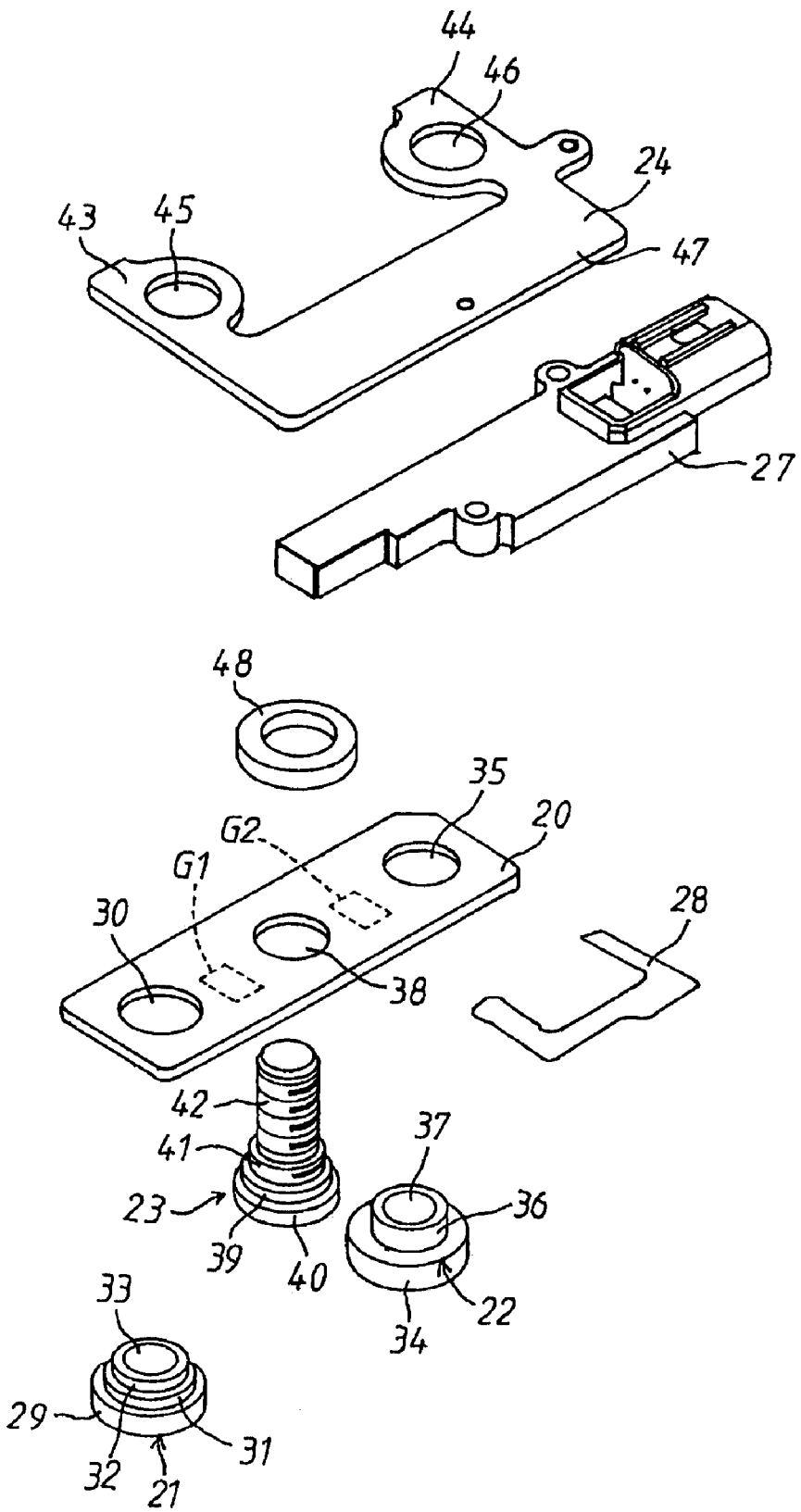
FIG. 3 is an exploded perspective view illustrating the occupant load detecting device of the seat for the vehicle.
Figure 5:
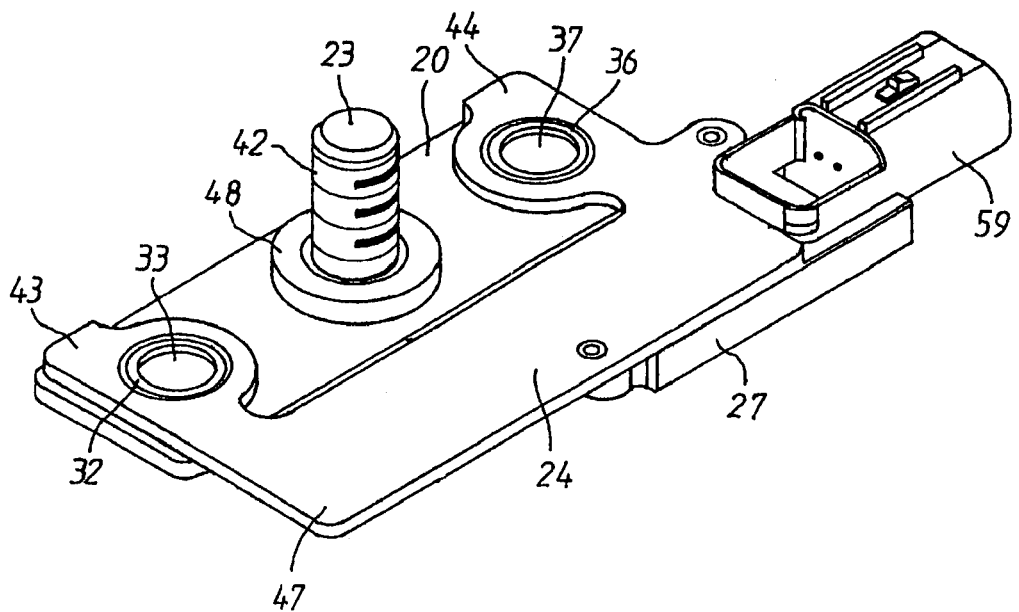
FIG. 5 is a perspective view illustrating the occupant load detecting device of the seat for the vehicle assembled.

As is illustrated in FIGS. 3 and 5, each occupant load detecting device 10 includes: a strain member 20; strain gauges G1, G2 attached to a surface (lower surface) of the strain member 20; a first lower bracket 21 (serving as a first supporting member) and a second lower bracket 22 (serving as a second supporting member) both securing the strain member 20 at its both ends to the corresponding fixing surface 18 of the lower rail 14; and a connecting shaft 23 fixed at the center of the strain member 20 and protruding vertically from the strain member 20. The connecting shaft 23 is firmly attached to the frame 17 of the seat 11. Each occupant load detecting device 10 further includes: an upper bracket 24 (serving as a bracket) firmly mounted on the upper surface of the strain member 20 at its both ends; an amplifier case 27 attached to an amplifier case attachment portion 47 of the upper bracket 24 and housing an amplifier substrate (not illustrated) for amplifying signals transmitted from the strain gauges G1 and G2; and an FPC (Flexible Printed Circuits) substrate 28 connected to the strain gauges G1, G2 and to the amplifier substrate (not illustrated).

As is obvious from FIG. 3, the first lower bracket 21 is structured with a first base portion 29 having a predetermined thickness in the vertical direction; an intermediate shaft portion 31 upwardly protruding from the first base portion 29 and pressed into a fixing hole 30 defined at a first end portion (one end portion) of the strain member 20; an upper shaft portion 32 upwardly protruding from the intermediate shaft portion 31; and an attachment hole surface 33 defined at the center of the first lower bracket 21 and penetrating therethrough. The second lower bracket 22 is structured with a second base portion 34 having a predetermined thickness in the vertical direction; a shaft portion 36 protruding from the second base portion 34 upwardly and idly inserted into an attachment hole 35 defined at a second end portion (the other end portion) of the strain member 20; and an attachment hole surface 37 defined at the center of the second lower bracket 22 and penetrating therethrough.

Figure 4:
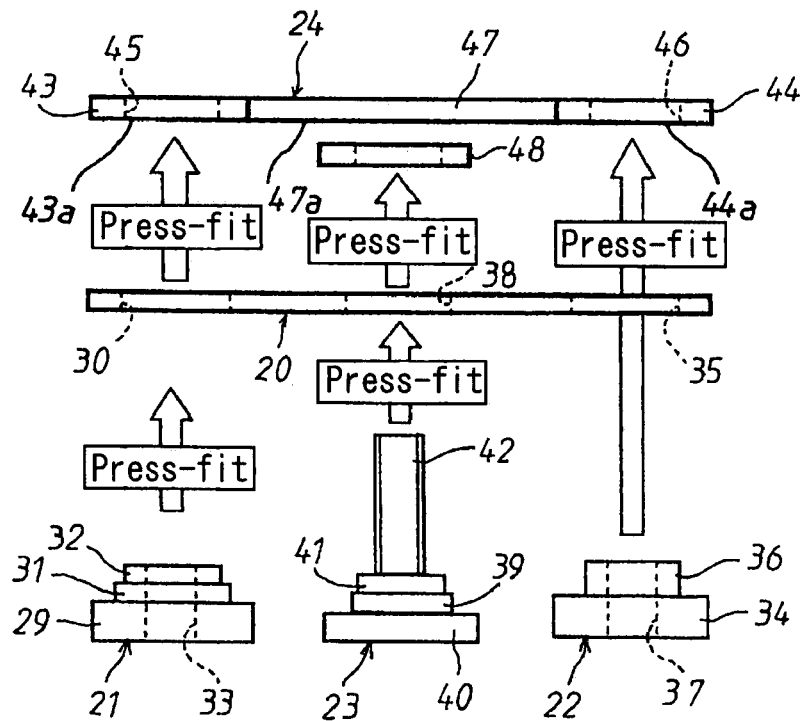
FIG. 4 is a schematic view illustrating a bracket and connecting shaft being assembled to a strain member.

The fixing hole 30 is formed at the first end portion of each strain member 20. In the same manner, the attachment hole 35 is formed at the second end portion of each strain member 20. The fixing hole 30 and the attachment hole 35 are arranged with the same distance as the predetermined distance of each pair of fixed shafts 19 formed at each end of each upper rail 16. As illustrated in FIG. 4, in cases where the first and second lower brackets 21, 22 are fitted into the strain member 20, the first base portion 29 of the first lower bracket 21 and the second base portion 34 of the second lower bracket 22 come in contact with the lower surface of the strain member 20. In this case, the intermediate shaft portion 31 of the first lower bracket 21 is press-fitted into the fixing hole 30 of the strain member 20, while the shaft portion 36 of the second lower bracket 22 is idly inserted into the attachment hole 35 of the strain member 20. The strain member 20 is further formed, at its center, with an intermediate hole 38, into which an intermediate shaft 39 of the connecting shaft 23 is press-fitted. The connecting shaft 23 includes, at its end, a flange 40 having a smaller thickness than the thicknesses of the first and second base portions 29, 34 of the first and second lower brackets 21, 22. The flange 40 of the connecting shaft 23 comes in contact with the lower surface of the strain member 20 when the connecting shaft 23 is press-fitted into the intermediate hole 38 of the strain member 20. The connecting shaft 23 further includes an second shaft portion 41 protruding from the upper surface of the intermediate shaft 39, and a fixed threaded portion 42 protruding from the upper surface of the second shaft portion 41. The second shaft portion 41 of the connecting shaft 23 is press-fitted into a center bracket 48 in a state where the intermediate shaft 39 of the connecting shaft 23 is press-fitted into the intermediate hole 38 of the strain member 20. So configured, the connecting shaft 23 is firmly attached to the strain member 20 at its base portion while the strain member 20 is interposed between the flange 40 of the connecting shaft 23 and the center bracket 48.

In the meantime, as illustrated in FIG. 2, one of the pair of fixed shafts 19 protruding vertically upwardly at each end of the upper rail 16 is fitted into the attachment hole surface 33 of the first lower bracket 21 and the other one of the pair of fixed shafts 19 is fitted into the attachment hole surface 37 of the second lower bracket 22. The bottom of the first and second base portions 29, 34 of the first and second lower brackets 21, 22 are seated on the fixing surface 18 of the upper rail 16. Nuts 60 are tightened to the threaded tip ends of the respective fixed shafts 19. The nuts 60 apply force vertically downwardly to fixed portions 43, 44 of the upper bracket 24. Therefore, the strain member 20 of each occupant load detecting device 10 is secured, at its both ends, to the fixing surface 18 of the upper rail 16 with a predetermined distance from the fixing surface 18, a predetermined distance corresponding to the thickness of the first and second base portions 29 and 34.

In addition, the tip end of the connecting shaft 23 of each occupant load detecting device 10 is physically associated with the seat 11 as follows. Left and right sides of the frame 17 for the seat 11 are formed with connecting surfaces 62, which laterally inwardly extend, respectively. Each connecting surface 62 is formed with a connecting through-hole 63. A fixed threaded portion 42 of the connecting shaft 23 is fitted into the connecting through-hole 63 in a manner that the bottom of the connecting surface 62 comes in contact with the upper surface of the center bracket 48. Accordingly, the frame 17 is firmly mounted on the upper rails 16 via the strain members 20. Nuts 65 are tightened to the fixed threaded portions 42 of the connecting shafts 23. The nuts 65 apply force vertically downwardly to the connecting surfaces 62 in a manner that the connecting surfaces 62 are pressed with center bracket 48. Therefore, the connecting shafts 23 of the occupant load sensors 10 are securely tightened to the frame 17 of the seat 11.

When the load of the occupant-seated on the seat 11 is applied to the strain member 20 via the connecting shaft 23, the strain member 20 is flexibly bent while being supported at both first and second ends thereof by the first and second lower brackets 21, 22. Therefore, at each area between the connecting shaft 23 and each first and second lower bracket 21, 22 on the surface of the strain member 20, compressive strain is generated at the side of the first and second brackets 21, 22, and tensile strain is generated at the side of the connecting shaft 23. Degrees of the compressive strain and the tensile strain are in proportion to the load of the occupant applied to the strain member 20. In order to detect the compressive strain and the tensile strain, the strain gauges G1, G2 are respectively attached to the areas between the central portion of the strain member 20 and both ends of the strain member 20, i.e., to the areas between the connecting shaft 23 and the first and second lower brackets 21, 22. Each strain gauge G1 and G2 includes two elements structuring a half-bridge. A full-bridge is structured by both half-bridges of the strain gauges G1 and G2, and the load of the occupant seated on the seat 11 is measured as a flexible deformation of the strain member 20.

As illustrated in FIG. 5, each upper bracket 24, for example made of a steel plate, is assembled on the upper surface of the strain member 20 at the both first and second ends of the strain member 20. The upper bracket 24 is provided with the fixed portions 43, 44 at both first and second ends, respectively. Additionally, as illustrated in FIG. 3, the fixed portions 43 and 44 are formed with fixed through-holes 45 and 46, respectively. The upper shaft portion 32 of the first lower bracket 21 is press-fitted into the fixed through-hole 45, and the shaft portion 36 of the second lower bracket 22 is press-fitted into the fixed through-hole 46, which both protrude from the upper surface of the strain member 20. The strain member 20 is hence supportively interposed at its both ends between the fixed portions 43, 44 of the upper bracket 24 and the base portions 29, 34 of the lower brackets 21, 22.

Further, the upper bracket 24 is formed with the amplifier case attachment portion 47 connecting the fixed portions 43 and 44, which attachment portion 47 extends at a side of the strain member 20 in a lateral direction of the seat, as illustrated in FIG. 5. As described above, because the strain member 20 overlaps the fixed portions 43, 44 of the upper bracket 24 but does not overlap the attachment portion 47 of the upper bracket 24, the upper bracket 24 does not influence the flexible deformation of the strain member 20. Therefore, it is possible to measure precisely the load of the occupant.

The attachment portion 47 of the upper bracket 24 is firmly fixed with the amplifier case 27, which is made of for example PBT (polybutylene terephthalate) resin, by means of a screw (not illustrated). The PBT resin for the amplifier case 27 is a more lightweight and economical material than aluminum used for a conventional case, thereby leading to a weight and cost saving amplifier case. The amplifier case 27 is provided with a connector 59 that establishes a communication path for transmitting an output of the amplifier substrate 26 to a non-illustrated electronic control unit.

In addition, the U-shaped FPC (Flexible Printed Circuits) substrate 28 is connected to the strain member 20 in a manner that ends of leg portions of the U-shaped FPC substrate 28 are respectively attached to the strain gauges G1, G2, i.e., to the areas between the central portion of the strain member 20 and both first and second ends of the strain member 20. Further, four through-holes (not illustrated) for connecting a wiring pattern of the FPC substrate 28 are provided at an intermediate portion thereof. Each through-hole is connected to each terminal of the amplifier substrate.

According to the occupant load detecting device of the seat for the vehicle with the above configuration, in a case where each occupant load detecting device 10 is attached to the corresponding fixed shaft 19 provided at the corresponding fixing surface 18, the strain member 20 is supported by the first and second bracket 21 and 22, both which are fixed by the upper bracket 24 to be relatively unmovable, and is made into a unit. Accordingly, the occupant load is detected with high precision without being influenced by a variation of a manufacturing measurement of the position of the fixing shaft 19 attached to the strain member 20.

Figure 6:
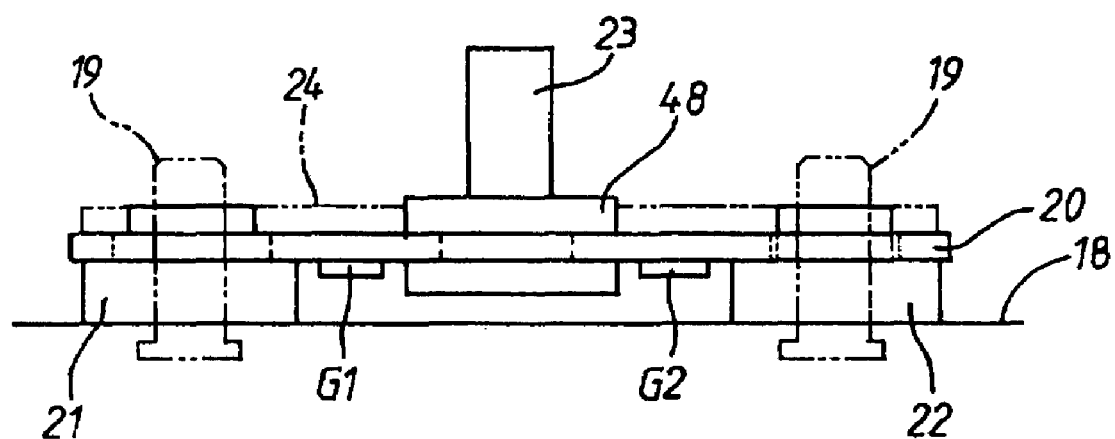
FIG. 6 is a schematic view illustrating an assembly of the occupant load detecting device of the seat for the vehicle.
Figure 7:
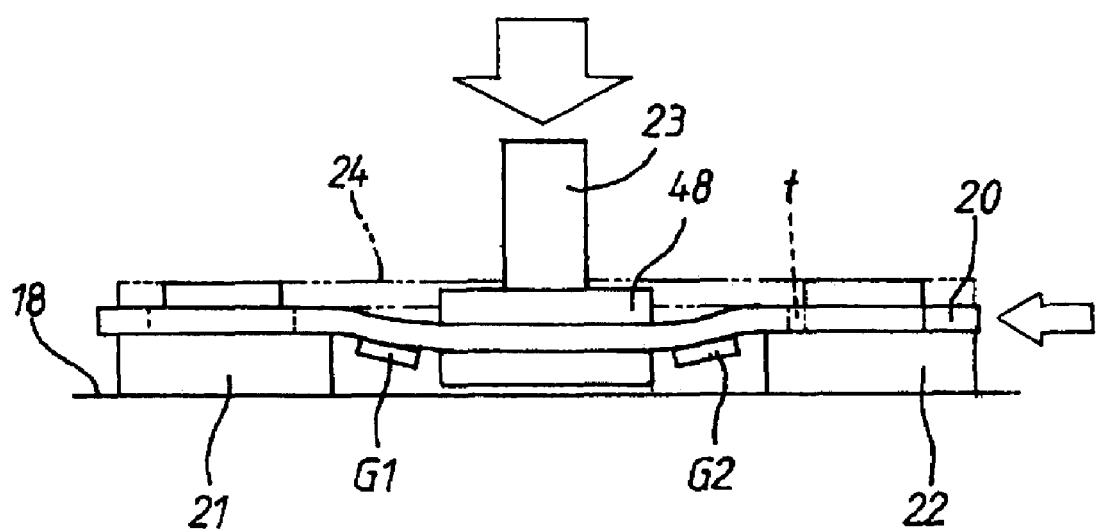
FIG. 7 is a schematic view illustrating a deformation of the strain member of the occupant load detecting device of the seat for the vehicle, the deformation operated by a load of an occupant.

Further, when the occupant is seated on the seat 11, the load of the occupant is applied to the frame 17 fixed to the seat cushion. Accordingly, the load is applied to the strain member 20 via the connecting shaft 23 of the occupant load detecting means 10 of the seat for the vehicle. As illustrated in FIGS. 6 and 7, when the strain member 20 is deformed, the first end thereof is fixed by the first bracket 21, so that the occupant load is detected with high precision without the position of the strain member 20 dislocated when measuring the occupant load. Further, the strain member 20 is supported, at its second end, by the second lower bracket 22 to be laterally slidable in a range of a predetermined gap t. Accordingly, the deformation of the detecting member 20 is not influenced by being supported at its both ends, and the occupant load is detected with high sensitivity. Still further, the amplifier case 27 is provided at a side portion of the upper rail 16 and the frame 17 in the lateral direction of the seat because of the amplifier case attaching portion 47 of the upper bracket 24. Accordingly, a space C1 (see FIG. 2) between the upper rail 16 and the frame 17 can be made smaller thus saving space.

As described above, the strain member 20 is supported by the first and second lower brackets 21 and 22 as simple members, such that the first bracket 21 is structured by the first base portion 29, the intermediate shaft portion 31, and the upper shaft portion 32 while the second bracket 22 is structured by the second base portion 34 and the shaft portion 36. Further, the first and second lower brackets 21 and 22 are fixed to the upper bracket 24. Accordingly, the occupant load detecting device 10 is configured as a unit with a simple structure, hence an occupant load detecting device, which may be manufactured readily and with low cost, can be provided.

Additionally, according to the above described embodiment, the strain member 20 is interposed by the upper bracket 24 located at the upper portion of the strain member 20, and the first and second lower brackets 21 and 22 located at the lower portion of the strain member 20. However, the configuration of the occupant load detecting device is not limited as described above. Alternatively, the occupant load detecting device 10 may be configured so that the upper bracket 24 and the first and second lower brackets 21, 22 are inverted, i.e., the lower brackets 21, 22 may be located at the upper portion while the upper bracket 24 may be located at the lower portion, of the strain member 20.

Still further, the upper bracket 24 is made of a steel plate. However, it is not limited to this, as the upper bracket 24 may be made of aluminum alloy, for example.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An occupant load detecting device of a seat for a vehicle, comprising:
    a strain member arranged between a floor-side fixing member adapted to be fixedly mounted on a vehicle floor and a seat-side fixing member adapted to be fixedly attached to a vehicle seat and having a strain gauge;
    a connecting member fixed to the strain member in a vertical direction of the seat and securely connected to one of the floor-side fixing member and the seat-side fixing member;
    a first supporting member relatively immovably fitted into a fixing hole formed at one end portion of the strain member and fixed to an attachment surface formed at the other one of the floor-side fixing member and the seat-side fixing member to support the strain member with a predetermined distance from the attachment surface;
    a second supporting member fitted into an attachment hole formed at the other end portion of the strain member and having a predetermined gap with the attachment hole, the second supporting member fixed to the attachment surface formed at the other one of the floor-side fixing member and the seat-side fixing member to support the strain member with the predetermined distance from the attachment surface; and
    a bracket including a first fixing portion relatively immovably fixing the first supporting member at one end portion of the bracket and a second fixing portion relatively immovably fixing the second supporting member at the other end portion of the bracket, the bracket being formed with an amplifier case fixing portion continuous with the first fixing portion and the second fixing portion and extending at a side of the strain member in a lateral direction of the seat.

2. An occupant load detecting device of a seat for a vehicle according to claim 1, wherein
    the fixed supporting member includes a first base portion having a predetermined thickness corresponding to the predetermined distance, a first shaft portion protruding from the first base portion and relatively immovably fitted into the fixing hole of the strain member, an second shaft portion protruding from the first shaft portion and relatively immovably fitted into the first fixing portion formed at the bracket, and a first attachment hole surface defined at the fixed supporting member penetrating through the first base portion, the first shaft portion, and the second shaft portion of the fixed supporting member, and wherein
    the fitted supporting member includes a second base portion having the predetermined thickness corresponding to the predetermined distance, a third shaft portion protruding from the second base portion and fitted into the attachment hole of the strain member with the predetermined gap, the third shaft portion relatively immovably fitted into the second fixing portion formed at the bracket, and a second attachment hole surface defied at the fitted supporting member penetrating through the second base portion and the third shaft portion of the fitted supporting member.

* * * * *